UNITED STATES PATENT OFFICE.

PAUL H. A. LEDER, OF BALTIMORE, MARYLAND.

PACKING.

SPECIFICATION forming part of Letters Patent No. 636,818, dated November 14, 1899.

Application filed September 2, 1899. Serial No. 729,383. (No specimens.)

*To all whom it may concern:*

Be it known that I, PAUL H. A. LEDER, a subject of the Emperor of Germany, residing at Baltimore, in the State of Maryland, have invented certain new and useful Improvements in Packing; and I do hereby declare the following to be a full, clear, and exact description of the invention, such as will enable others skilled in the art to which it appertains to make and use the same.

My invention relates to packing which, although available for obtaining fluid-tight joints generally, is more particularly designed as a means for providing a fluid-tight closure for bottles, jars, and similar vessels containing beverages and food products.

Heretofore cork and rubber have generally been used for the purposes stated. Both substances have, however, inherent disadvantages. The former, cork, in that it is readily attacked by acids such as are generally present in food products, is quite readily decomposed and then liable to impart a very disagreeable smell and taste to substances contained in the vessel closed thereby. Rubber has likewise the disadvantage of imparting a disagreeable taste and smell to substances in contact therewith and although not as readily affected by acids is nevertheless very perishable when exposed to atmospheric influences.

A stopper or other packing serving the purposes referred to and obviating the disadvantages inherent to cork and rubber and other sealing substances heretofore used should therefore possess the required degree of elasticity, it should be acid-proof and proof against atmospheric influences and comparatively high temperatures, it should be impermeable by liquids and gases and indifferent to their action, and, finally, it should be both tasteless and odorless.

My invention has for its object the production of a packing possessing all the properties last referred to, and in carrying out my invention I use asbestos fibers in a more or less finely divided state, felted or otherwise united, as by means of a solution of silicate of magnesia, and molded or otherwise formed to the desired shape by pressure, so as to leave a comparatively porous more or less elastic body. Such a substance or body is odorless and tasteless, acid-proof, proof against high temperatures, and indifferent to atmospheric influences or to the action of liquids and gases. It is, however, permeable both by liquids and gases, and to render it impermeable I saturate the body with a solution of cellulose—as, for instance, a solution of pure collodion in alcohol, ether, or acetone—the cellulose acting as a waterproofing agent without impairing the elasticity of the asbestos body. The volatile solvent is then allowed to evaporate or is driven off by heat and may be recovered by well-known means. On the other hand, I can use asbestos fibers, saturate the same with a solution of cellulose, and then form the stopper or other packing from this composition by well-known means resorted to in plastics. The stopper or other packing may then be used, though I prefer, not only for the purpose of increasing its impermeability, but also with a view to impart to the finished product smooth surfaces, thereby decreasing its liability to stick and facilitating the fashioning thereof, to impregnate the cellulose-saturated asbestos fibers with a solution of paraffin in a volatile solvent—as, for instance, ordinary gasolene—this solvent being likewise allowed to evaporate or being driven off by heat.

Although the paraffin increases the impermeability of the product by liquids and gases, is odorless and tasteless, is unaffected by such acids as are generally present in many food products, and is unaffected by comparatively high temperatures or atmospheric influences, it does not in the least impair the elasticity or compressibility of the product, and when the latter is used as a packing for moving machine elements it is in a measure self-lubricating.

Notwithstanding the fact that the packing is composed in part of paraffin and cellulose, it is substantially fireproof.

I have described one mode of manufacturing my improved packing, but as an example only, as my invention may be carried out in many different ways. In fact, the mode of manufacture depends in a measure upon the nature or more properly the bulk of the final product. Thus, for instance, asbestos fibers which are more or less finely divided according as the final product is to be of a greater or less density may be felted into the form of thin sheets in a paper-making machine. A number of these sheets, according to the thickness of the final product, are then laid one upon another and subjected to pressure, and from this thick sheet the packing to be obtained is then stamped out, as disks, rings, or gaskets, &c., which are afterward successively treated with cellulose and paraffin, or the thick sheet may first be saturated or impregnated with cellulose and then with paraffin, or if the final product is to be of considerable thickness a greater or less number of the thin sheets may be treated with cellulose and paraffin and interposed between sheets not so treated, the thick sheet being subsequently treated with cellulose and paraffin before or after compression; or the packing may be made of any so-called "asbestos cement," so long as the constituents thereof are of such a character that the final product will have the properties described.

I am aware that it has been proposed to waterproof fabrics, among others asbestos fabrics, by treating such with a nitrocellulose; and I am also aware that paper has been waterproofed by treating the same with paraffin, and I do not desire to claim broadly either treatment *per se*. It will, however, be readily understood that a fabric, even an asbestos fabric treated with nitrocellulose, would not be available as a packing serving the purposes and having the properties described, and, as is well known, paper treated with paraffin will not serve the purposes of packing.

Having thus described my invention, what I claim as new therein, and desire to secure by Letters Patent, is—

As an article of manufacture, an elastic or compressible packing, consisting essentially of asbestos fibers, cellulose and paraffin, substantially as set forth.

In testimony that I claim the foregoing as my invention I have signed my name in presence of two subscribing witnesses.

PAUL H. A. LEDER. [L. S.]

Witnesses:
G. SCHNEYDER,
A. A. WEST.